US011383937B2

(12) United States Patent
Lisso et al.

(10) Patent No.: US 11,383,937 B2
(45) Date of Patent: Jul. 12, 2022

(54) SYSTEMS AND METHODS FOR WAREHOUSE ORDER SORTATION

(71) Applicant: Target Brands, Inc., Minneapolis, MN (US)

(72) Inventors: Gregory Lisso, Minneapolis, MN (US); Thomas Gardner, Minneapolis, MN (US); David Sellner, Minneapolis, MN (US); Tyler Park, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/150,765

(22) Filed: Jan. 15, 2021

(65) Prior Publication Data

US 2021/0323776 A1 Oct. 21, 2021

Related U.S. Application Data

(60) Provisional application No. 63/012,389, filed on Apr. 20, 2020.

(51) Int. Cl.
*B65G 47/30* (2006.01)
*B65G 43/10* (2006.01)

(52) U.S. Cl.
CPC ............ *B65G 47/30* (2013.01); *B65G 43/10* (2013.01)

(58) Field of Classification Search
CPC ................................ B65G 43/10; B65G 47/30
USPC ...................................................... 198/347.1
See application file for complete search history.

(56) References Cited

U.S. PATENT DOCUMENTS

| 7,695,354 | B2* | 4/2010 | Kragh | A22C 25/12 |
| | | | | 452/127 |
| 7,979,359 | B1 | 7/2011 | Young et al. | |
| 8,538,578 | B2 | 9/2013 | Battles et al. | |
| 8,718,814 | B1 | 5/2014 | Clark et al. | |
| 9,138,781 | B1* | 9/2015 | Strong | A22C 17/12 |
| 9,280,756 | B2 | 3/2016 | Hara et al. | |
| 2009/0000908 | A1* | 1/2009 | Brain | B65G 37/005 |
| | | | | 700/226 |
| 2019/0375527 | A1* | 12/2019 | Voelker | B65B 35/44 |

(Continued)

OTHER PUBLICATIONS

Dematic [Online] "Circular Sorters: Crossbelt Sorter," 2021, retrieved on Jan. 14, 2021, https://www.dematic.com/en-us/products/products-overview/sortation-systems/circular-sorters/crossbelt-sorter/, 5 pages.

*Primary Examiner* — Gene O Crawford
*Assistant Examiner* — Lester Rushin, III
(74) *Attorney, Agent, or Firm* — Fish & Richardson P.C.

(57) ABSTRACT

Warehouse automation and methods of automatically sorting and sequencing items can be implemented to streamline and expedite order fulfillment and store replenishment processes in a cost-effective manner. Some embodiments described herein include sorting items to a truck-level and inducting those items for a first truck into a buffering and sequencing system. Items can temporarily accumulate in the buffering and sequencing system and thereafter be discharged in a desired sequence as the items become available within the buffering and sequencing system. In some embodiments, the buffering and sequencing system is used to sequence items for loading one or more store aisle-ready carts in a sequence that corresponds to a store aisle layout.

20 Claims, 13 Drawing Sheets

(56) References Cited

U.S. PATENT DOCUMENTS

2020/0130949 A1\* 4/2020 Pietrowicz ............. G06Q 10/08
2021/0300682 A1\* 9/2021 Lindley ................ B65G 1/1376

\* cited by examiner

SYSTEMS AND METHODS FOR WAREHOUSE ORDER SORTATION

CROSS-REFERENCE TO RELATED APPLICATIONS

This applications claims the benefit of U.S. Provisional Application Ser. No. 63/012,389, filed Apr. 20, 2020. The disclosure of the prior application is considered part of (and is incorporated by reference in) the disclosure of this application.

TECHNICAL FIELD

This document relates to systems and methods for enhancing efficiencies of order fulfillment processes. For example, this document relates to warehouse automation and methods of automatically sorting and sequencing items to streamline order fulfillment and store replenishment processes.

BACKGROUND

The order fulfillment process refers to all the steps that companies take from the moment they receive a customer order (which can include an order that is wholly or partly internal to the company, such as a store replenishment order) to the moment that the items are landed in customers' hands. Such steps can include, for example: the order is sent to the warehouse; order sortation (e.g., a worker goes into the warehouse, finds the items in the order, and picks the items off the warehouse shelf); the order is packed for shipping; and the order is shipped.

The use of warehouse automation is one way to increase the efficiency of an order fulfillment process. The goal of warehouse automation is to cut out manual steps of the order fulfillment process, to help reduce the occurrences of human error and to make processes more efficient. Two-day deliveries are currently standard, and customers are often willing to pay extra for same-day or next-day deliveries. Highly efficient warehousing, order sortation, and shipping processes are on the frontline of meeting this high level of customer expectations.

SUMMARY

This document describes systems and methods for enhancing efficiencies of order fulfillment processes. For example, this document describes warehouse automation and methods of automatically sorting and sequencing items to streamline and expedite order fulfillment and store replenishment processes in a cost-effective manner. For example, in some embodiments the systems and methods described herein include: (i) sorting items to a truck-level, (ii) buffering the items until the proper sequence of the items for a first cart (or other type of transport vessel, or other type of sub-set) of the first truck are available for loading the first cart. Then, moving from the buffer all of the items designated for the first cart in a sequence that corresponds to a store aisle layout. The items can be loaded manually (or in an automated manner) into particular locations in the first cart in correspondence with the sequence. Then, the loaded first cart can be moved into the first truck (which can be, at least in some embodiments, performed in a particular sequence with other carts for the first truck to make store replenishment efficient).

In one aspect, this disclosure is directed to automated systems and methods for sorting and sequencing items for shipments, such as into a store aisle-ready sequence or arrangement. In some embodiments, a system for sequencing items of a shipment into a store aisle-ready arrangement includes a main conveyor, a buffering conveyor, a take-away conveyor, and a control system. The main conveyor is configured to transport the items. The buffering conveyor branches off of the main conveyor and is configured to receive the items from the main conveyor. The buffering conveyor is configured to temporarily store the items. The take-away conveyor is adjacent to the buffering conveyor and configured to receive the items from the buffering conveyor. The control system is configured to: (i) control the main conveyor to cause the items to individually transfer from the main conveyor to the buffering conveyor; (ii) determine whether each item of the items transferred to the buffering conveyor is a next item to be transferred to a store-friendly transport vessel; and (iii) control the buffering conveyor to cause an item of the items to transfer from the buffering conveyor to the take-away conveyor in response to determining that the item is the next item to be transferred to the store-friendly transport vessel.

Such a system for sequencing items of a shipment into a store aisle-ready arrangement may optionally include one or more of the following features. The buffering conveyor may be a first buffering conveyor, the take-away conveyor may be a first take-away conveyor, and the system may also include a second buffering conveyor and a second take-away conveyor. The control system may be configured to control the main conveyor to individually transfer the items to either the first buffering conveyor or the second buffering conveyor using criteria. The criteria may include obtaining equal utilization of the first and second buffering conveyors. The output ends of the first and second take-away conveyors may each be connected to a final take-away conveyor. The first and second take-away conveyors and the final take-away conveyor may be arranged in a Y-shape. The first and second buffering conveyors may be located between the first and second take-away conveyors.

In another aspect, this disclosure is directed to an automated method for sequencing items of a shipment into a store aisle-ready arrangement. The method includes: controlling a main conveyor to cause the items to individually transfer from the main conveyor to a buffering conveyor that is a branch of the main conveyor; determining whether each item of the items transferred to the buffering conveyor is a next item to be transferred to a store-friendly transport vessel; and controlling the buffering conveyor to cause an item of the items to transfer from the buffering conveyor to a take-away conveyor adjacent to the buffering conveyor in response to determining that the item is the next item to be transferred to the store-friendly transport vessel.

Such a method for sequencing items of a shipment into a store aisle-ready arrangement may optionally include one or more of the following features. In some embodiments, each of the items transferred to the buffering conveyor remain on the buffering conveyor until it is the next item to be transferred to the store-friendly transport vessel. The buffering conveyor may be a first buffering conveyor, and the method may also include controlling the main conveyor to cause the items to individually transfer from the main conveyor to either the first buffering conveyor or a second buffering conveyor that is also a branch of the main conveyor. The main conveyor may be controlled to individually transfer the items to either the first buffering conveyor or the second buffering conveyor using criteria. The criteria may include obtaining equal utilization of the first and second buffering conveyors. The criteria may include fully utilizing the first buffering conveyor before utilizing the second buffering conveyor. The criteria may include utilizing the first buffering conveyor to a threshold percentage before utilizing the second buffering conveyor.

In another aspect, this disclosure is directed to warehouse system for sorting and sequencing items. The system includes a main conveyor, a first buffering and sequencing system, and a second buffering and sequencing system. The main conveyor is configured to transport the items. The first buffering and sequencing system includes: (i) a first buffering conveyor branching off of the main conveyor and configured to receive the items from the main conveyor, the first buffering conveyor configured to temporarily store the items; and (ii) a first take-away conveyor adjacent to the buffering conveyor and configured to receive the items from the first buffering conveyor. The second buffering and sequencing system includes: (i) a second buffering conveyor branching off of the main conveyor and configured to receive the items from the main conveyor, the second buffering conveyor configured to temporarily store the items; and (ii) a second take-away conveyor adjacent to the buffering conveyor and configured to receive the items from the second buffering conveyor.

Such a warehouse system for sorting and sequencing items may optionally include one or more of the following features. The system may also include a control system configured to control the main conveyor to cause: (i) a first group of the items to individually transfer from the main conveyor to the first buffering conveyor and (ii) a second group of the items to individually transfer from the main conveyor to the second buffering conveyor. The first group of the items may be designated for a first shipment and the second group of items may be designated for a second shipment that differs from the first shipment. The control system may be configured to: determine whether each item of the first group of items transferred to the first buffering conveyor is a next item to be transferred to a first store-friendly transport vessel; and control the first buffering conveyor to cause an item of the first group of items to transfer from the first buffering conveyor to the first take-away conveyor in response to determining that the item is the next item to be transferred to the first store-friendly transport vessel. The control system may be configured to: determine whether each item of the second group of items transferred to the second buffering conveyor is a next item to be transferred to a second store-friendly transport vessel; and control the second buffering conveyor to cause an item of the second group of items to transfer from the second buffering conveyor to the second take-away conveyor in response to determining that the item is the next item to be transferred to the second store-friendly transport vessel. The system may also include a third buffering and sequencing system comprising: a third buffering conveyor branching off of the main conveyor and configured to receive the items from the main conveyor, the third buffering conveyor configured to temporarily store the items; and a third take-away conveyor adjacent to the buffering conveyor and configured to receive the items from the third buffering conveyor.

The systems, methods, and processes described herein may be used to provide one or more of the following optional benefits. First, some embodiments provide an order fulfillment process that is more responsive and agile so that orders can be shipped to internal and external customers in a shorter timeframe than current processes. In particular, the automated systems, methods, and processes described herein add the potential for using a substantial granularity of order sortation processes in comparison to conventional warehouse sorting systems, methods, and processes for outbound shipments. Adding the granular sorts can reduce delays and interferences in the warehouse, and/or in processes downstream of the warehouse (e.g., store replenishment processes, and the like).

Second, some embodiments allow multiple types of orders to be processed and fulfilled using the same (or essentially the same) order fulfillment process. For example, direct-to-customer shipments, store replenishment orders, customer pick-up-at-store orders, forward deployment of inventory shipments, inventory transfers, and the like can be advantageously processed and fulfilled using essentially the same systems, methods, and processes described herein. In particular, adding more granular sorts can increase the warehouse's capability to sequence items for efficient store replenishment or other types of orders to be processed and fulfilled.

Third, the accuracy of order fulfillment processes can be enhanced by eliminating human errors by using the automated systems, methods, and processes described herein. For example, automation can be controlled to accurately transport items that are inducted into the buffer described herein to designated loading stations, trucks, or other locations or assets in the warehouse. The items can be inducted from multiple points into particular portions of the buffer. This can reduce labor costs associated with the order fulfillment processes.

Fourth, warehouse space requirements can be reduced by using the automated systems, methods, and processes described herein. Moreover, implementing and using the buffers for order sortation and sequencing, as described herein, can be accomplished with minimal interruptions to warehouse operations and/or downtime in outbound shipments.

Fifth, the equipment required for sorting and sequencing the parcels for shipment as described herein are relatively low cost to implement and operate.

Sixth, the systems, methods and processes described herein can advantageously improve and/or un-constrain upstream picking processes that are performed using a wave picking methodology. Warehouse orders are often released/processed in waves over time periods of hours, shifts, days, or volume and/or other constrained windows. The systems, methods and processes described herein enable improvements in the context of the overlap of pick waves, and can accommodate downstream accumulation, processing and sorting of inventory. Such improvements can provide picking enhancements in terms of productivity and density of order pick containers (order picker cages, pallets, carts, etc.).

Other features, aspects, and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes the daily replenishment and movement of inventory generated from real-time demand singles for in-store retail sales and/or direct-to-guest on-line sales fulfilled from a multi-echelon inventory-holding model at the correct unit of measure, using fast and easy material handling equipment that will create operational efficiency at every process step in the supply chain. Said another way, this document describes warehouse automation and methods of controlling material flow to streamline and to consolidate different types of order fulfillment processes (which can include, for example, orders for direct shipments to consumers, orders that are wholly or partly internal to the company such as a store replenishment orders, and/or other like order fulfillment processes).

Figure 1:
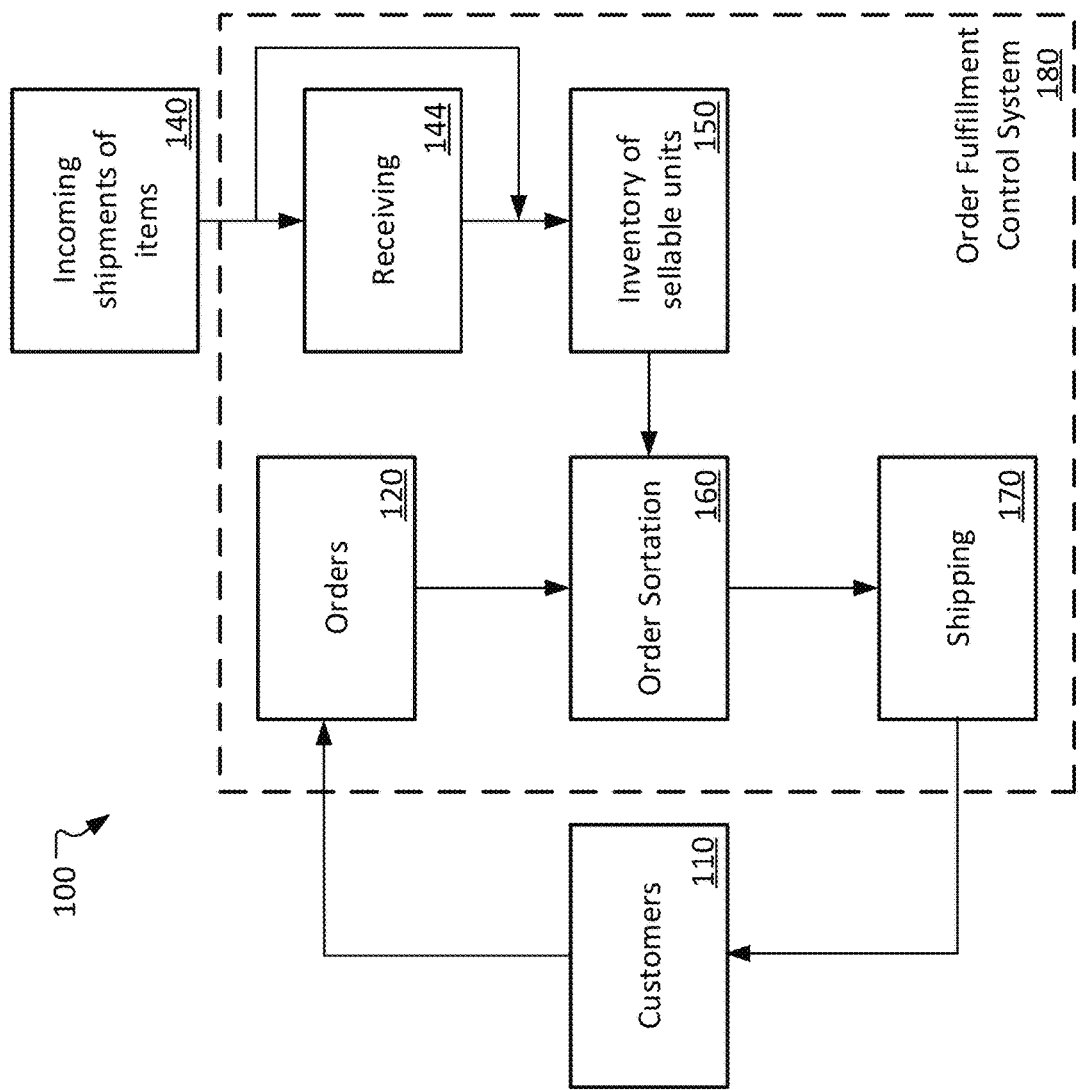
FIG. 1 is a highly-simplified schematic diagram of a basic order fulfillment process.

FIG. 1 depicts an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" (or simply "warehouse") may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations or transport vessels, such as racks, shelves, containers, vessels, carts, bins, totes, pallet lanes, and the like. Such storage accommodations or transport vessels can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order sortation 160, the sellable item(s) included in the customer order 120 are compiled in preparation for shipment to the respective customer 110. To fulfill the customer orders 120, the one or more items specified in each order may be retrieved, or picked, from inventory 150. Picked sellable items may be delivered or conveyed to one or more areas in the flow center for sorting and assembling into one or more outbound shipping containers for the fulfillment of a respective customer order 120. Outbound shipping containers containing the ordered sellable items are then transported to customers 110 at the step of shipping 170.

FIG. 1 and the foregoing description of the order fulfillment process 100 has provided a high-level overview of the operations of a flow center. Next, in the following figures, order sortation systems and methods will be described.

Figure 2:
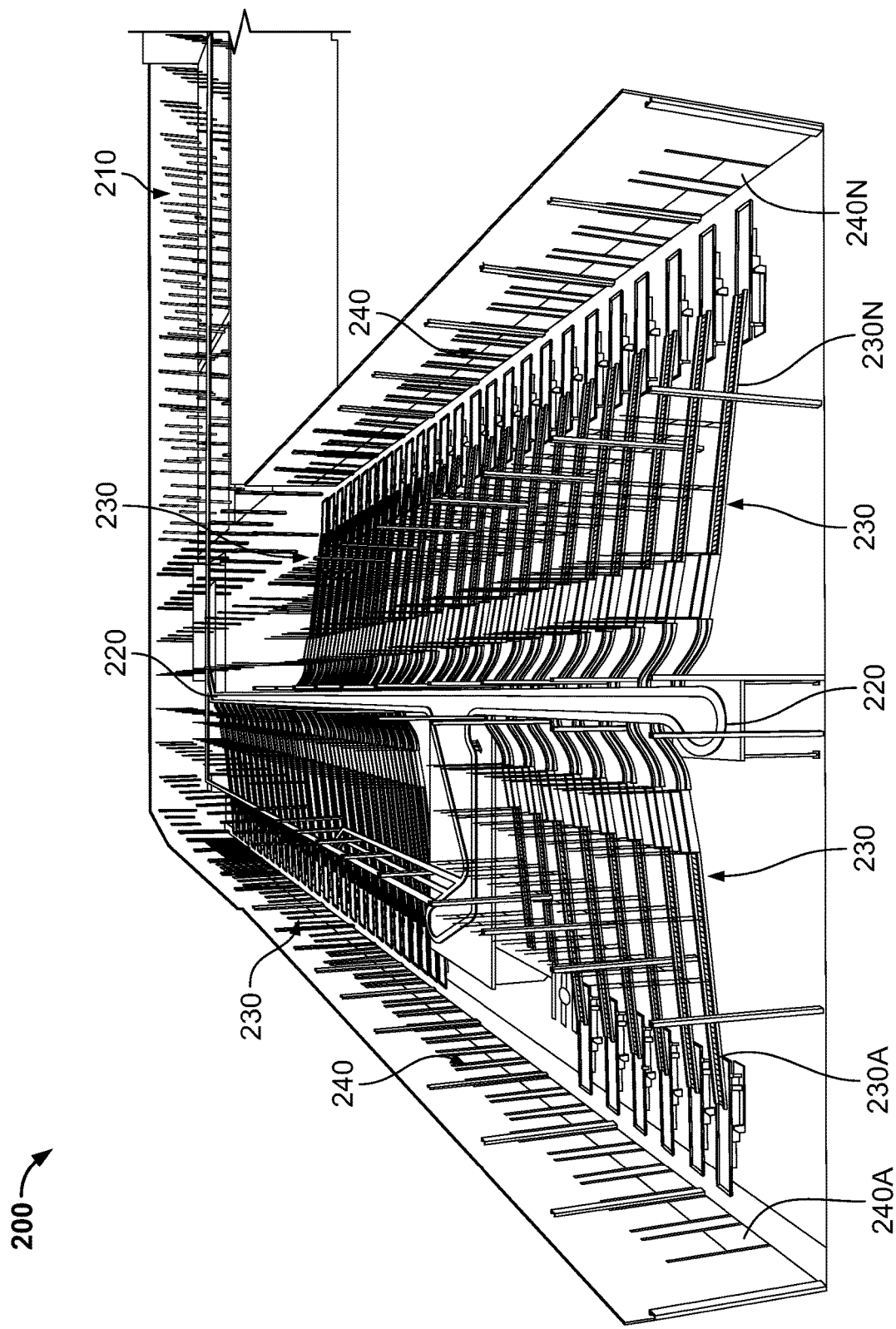
FIG. 2 depicts an example truck-level order sortation system in accordance with some embodiments.

FIG. 2 depicts an example truck-level order sortation system 200 in accordance with some embodiments described herein. While not specifically depicted in FIG. 2, it should be understood that the operations of the order sortation system 200 involve the use of an order fulfillment control system (such as a warehouse management system, one or more computerized automation/robotic control systems, and/or other such systems that can communicate and coordinate control activities between each other and across the overall order sortation system 200). Such an order fulfillment control system can be situated locally, remotely situated, or both locally situated and remotely.

From an overview standpoint, the order sortation system 200 includes one or more inventory storage areas 210. The storage area(s) 210 can be any location in the warehouse where items that are ready to be dispatched to trucks (e.g., semi-trailers) for delivery to stores or other customers are temporarily stored. The storage area(s) 210 can include various types of storage accommodations or transport vessels as previously discussed in FIG. 1, such as racks, shelves, containers, vessels, carts, bins, totes, pallet lanes, and the like to temporarily store the boxes or other items.

When an item (e.g., box, carton, container, etc.) is called for to be transported to a designated truck for outbound shipment, the item can be manually or automatically loaded onto a conveyor 220, or other type of item transportation system/technique. In some embodiments, the conveyor 220 can be elevated to a particular height above the floor of the warehouse to allow for unobstructed movement of human workers and warehouse vehicles, such as forklifts, below the conveyor 220. In other embodiments, the conveyor 220 can be placed on the floor of the warehouse rather than elevated.

The conveyor 220 can be generally horizontal but can also have inclines, declines, and/or tilt depending on the existing configuration of the conveyor 220 and needs of the warehouse facility. In some embodiments, the conveyor 220 (or mechanisms associated therewith) can be configured to direct and/or push items off in one or more directions (e.g., perpendicularly) using known processes (e.g., pop-up transfer, cross-belt transfer, tilt-tray transfer, shoe-transfer, etc.).

In some embodiments, the conveyor 220 continues down essentially an entire length of the warehouse or order sortation system 200, such that the conveyor 220 has access to each sorting lane in the warehouse. In particular embodiments, the conveyor 220 continues down a certain length that is not the entire length of the system 200. The conveyor 220 can also be configured in any other way that is advantageous to meet the needs of the warehouse and the warehouse's customers. The conveyor 220 can further have different widths depending on the types of items it transports. In other embodiments, the conveyor 220 can have a vacuum, suction-type feature and/or a textured belt that holds a product on the surface of the belt whenever there are changes in elevation and/or speed of the conveyor 220. Other types of conveyor configurations known in the field can be implemented in the order sortation system 200 depicted in FIG. 2.

In the example embodiment of FIG. 2, the conveyor 220 is elevated above the floor of the warehouse and has multiple connection and/or access points that disperse items to one or more sorting lanes 230 (such as the exemplary sorting lanes 230A and 230N which are representative of the extensive number of sorting lanes 230). Each sorting lane 230 ends near a designated and/or associated truck loading zone 240 where an assigned or associated truck (e.g., semi-trailer) is located and waiting to be loaded. For example, in this embodiment, sorting lane 230A receives items from the conveyor 220 that are intended to ship out on a truck stationed at the truck loading zone 240A. Therefore, only items assigned to the truck in the truck loading zone 240A are inducted/transferred from the conveyor 220 onto the sorting lane 230A, to then be moved into the truck/trailer at the truck loading zone 240A.

In the embodiment of FIG. 2, there is generally no particular order or sequence that items are inducted onto sorting lanes 230 or packed into the trucks at the truck loading zones 240. In other words, there is generally no item-level sequencing because items are not being inducted onto the sorting lanes 230 in a particular order (e.g., a sequence corresponding to how the items will be unpacked, such as corresponding to a store aisle layout in the case of an aisle-ready shipment).

Although not depicted in FIG. 2, in some embodiments, one or more of the sorting lanes 230 can be replaced by one or more conveyors that end at the truck loading zones 240. As a result, the main conveyor 220 can induct items onto other conveyors that branch off it (as depicted). In yet other embodiments, there may be a system of conveyors rather than just the single main conveyor 220. Items can be transported through the system of conveyors before being inducted onto a sorting lane associated with a truck loading zone. The system of conveyors may be advantageous in a warehouse facility that is larger in scale, has a multitude of truck loading areas, and/or is not L-shaped.

In some embodiments, the sorting lanes 230 can end at loading stations (e.g., workstations), wherein each loading station is associated with a particular truck loading zone 240. One or more human workers can be assigned to a particular loading station and tasked with moving items that come off the associated sorting lane 230 into one or more carts or other type of transport vessel (e.g., as previously discussed in reference to FIG. 1), and load the carts/vessels into a truck/trailer at the associated truck loading zone 240. In other embodiments, a robot can be assigned to a particular loading station to carry out the tasks that the human operator(s) would perform.

The systems and methods described below in reference to FIGS. 3-13 provide several enhancements to the truck-level order sortation system 200. For example, the systems and methods described below in reference to FIGS. 3-13 provide item-level sequencing (e.g., a sequence corresponding to how the items will be unpacked, such as corresponding to a store aisle layout in the case of an aisle-ready shipment).

Figure 3:
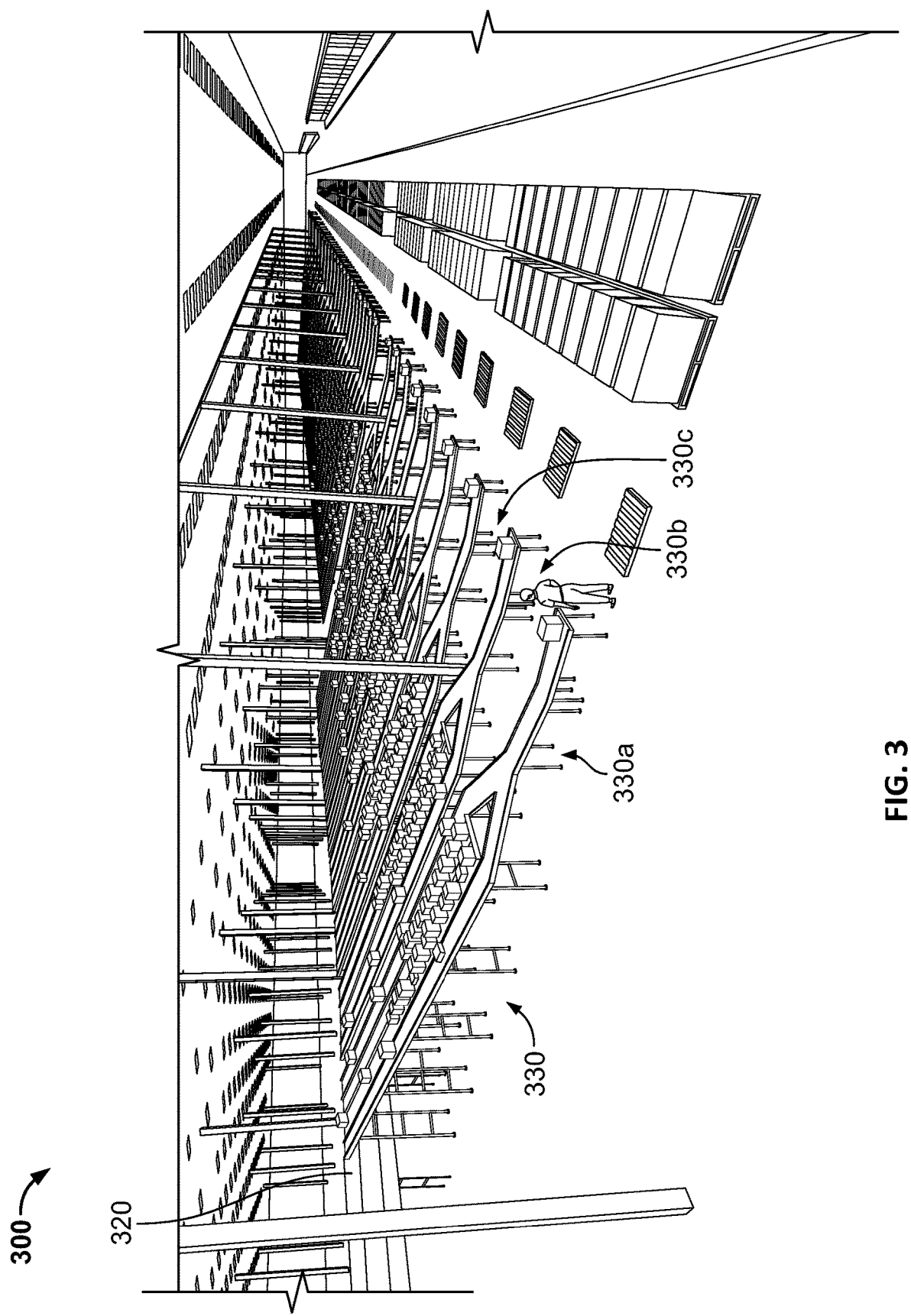
FIG. 3 is a perspective view of an example warehouse sorting and sequencing system in accordance with some embodiments.

FIG. 3 depicts an example store-replenishment-cart-level order sortation and sequencing system 300 (or simply "system 300"). In other words, the system 300 is operable for sorting/sequencing items to the granularity necessary for loading a store replenishment cart (or other types of transport vessel) in a particular order/arrangement that coincides with a layout of a store aisle or aisles. Such an item-carrying vessel can therefore be referred to as an aisle-ready cart, because the cart is loaded with items in a particular arrangement that simplifies store shelf replenishment, making for a highly efficient store-shelf replenishment process.

The aisle-ready carts (or storage-friendly transport vessels) can include any type of device, such as a cart, pallet, bin, or multiple bins on a cart, which has wheels, no wheels, or is transportable around a facility by other means. For example, where the aisle-ready transport vessel has wheels, such as a cart, it can be wheeled into a store, and more specifically, wheeled into a particular aisle in the store where items that were sorted and sequenced into the aisle-ready cart can now be conveniently stocked in the particular aisle/shelves.

While not specifically depicted in FIG. 3, it should be understood that the system 300 involves the use of an order fulfillment control system (such as a warehouse management system, one or more computerized automation/robotic control systems, and/or other such systems that can communicate and coordinate control activities between each other and across the overall system 300). Such an order fulfillment control system can be situated locally, remotely situated, or both locally situated and remotely.

Similar to the truck-level order sortation system 200 depicted in FIG. 2, this system 300 includes a main inventory storage area (not visible) where items are temporarily stored until they are ready for shipment and moved onto a main conveyor 320. The main conveyor 320 transports items as previously described in FIG. 2.

The system 300 also includes or more buffering and sequencing systems 330 that branch off the main conveyor 320. Similar to FIG. 2, the system 300 can include a multitude of buffering and sequencing systems 330 (such as a first buffering and sequencing system 330a, a second buffering and sequencing system 330b, a third buffering and sequencing system 330c, and so on) that branch off the main conveyor 320. In the depicted embodiment, each of the buffering and sequencing systems 330 comprises one or more conveyor lanes that branch off from the main conveyor 320 as described further below. The buffering and sequencing systems 330 are in that manner analogous to the sorting lanes 230 (FIG. 2). However, contrary to the sorting lanes 230, the buffering and sequencing systems 330 include capabilities to buffer and sequence items in a desired item-by-item sequence.

Items are transferred from conveyor 320 to particular buffering and sequencing systems 330 in correspondence with the shipment (e.g., truck/trailer) in which they are to be shipped. Once an item arrives at the end of a buffering and sequencing system 330 (e.g., the example buffering and sequencing system 330a), a human worker (or a robot) can readily load the items into the particular shipping container (e.g., aisle-ready cart) in the correct sequence and/or location in the container. As a result, human error in appropriately loading the aisle-ready cart can be reduced, if not, removed altogether.

Once the cart is filled as intended, it can be transported by the human operator or a mobile robot to the particular truck/trailer it is designated for. Additional items that are intended for shipment via a particular truck/trailer are continued to be transferred onto the conveyor 320 and then to the corresponding sorting lane, such as the buffering and sequencing system 330a.

In some embodiments, the items are processed by the buffering and sequencing systems 330 in a particular sequence (e.g., order) that corresponds with a particular sequence for how multiple aisle-ready carts are to be loaded in a truck. Such a sequence for positioning multiple aisle-ready carts in the truck can also be leveraged to increase efficiencies of store shelf replenishment processes.

The system 300 is advantageous because in some cases existing warehouse assets (e.g., sorting lanes, conveyors, etc. as depicted in FIG. 2) can be repurposed or reconfigured, which decreases the costs of implementing the system 300, increases efficiency, and ensures that there is essentially no downtime or interruptions to the operations of the warehouse. Repurposing existing assets may be less expensive than buying and installing new assets to create a store replenishment cart level order sortation and sequencing system. Moreover, when new equipment is required to be purchased to implement the system 300, the equipment required is relatively low cost as compared to other types of order sortation and sequencing systems. The relatively low complexity of the system 300 also provides an advantageous scenario because it ensures the warehouse does not experience long periods of downtime while the system 300 is implemented.

As described further below, sequencing of individual items is possible in the system 300 because the buffering and sequencing systems 330 include temporary storage areas, or a buffer, for items (e.g., cartons, containers, packages, boxes, totes, etc.). In other words, items for a particular cart associated with a shipment or truck are temporarily stored in the buffering and sequencing systems 330 until the desired sequence of items (or at least the next desired item, or a partial sequence of items) is located in the buffering and sequencing system 330. Then, a fleet management system or other type of control system in communication with the order fulfillment system can control the buffering and sequencing system 330 to transport the items in the correct sequence to the loading station for loading into the associated aisle-ready cart. The items in the particular cart can be sequenced to correspond to a particular store aisle layout or to other criteria, as discussed in more detail below.

While this disclosure describes the process of sequencing items in the context of loading store aisle-ready carts, it should be understood that the systems and methods described herein can be used for the sequencing of items for any other purposes (in addition to aisle-ready carts).

Figure 4:
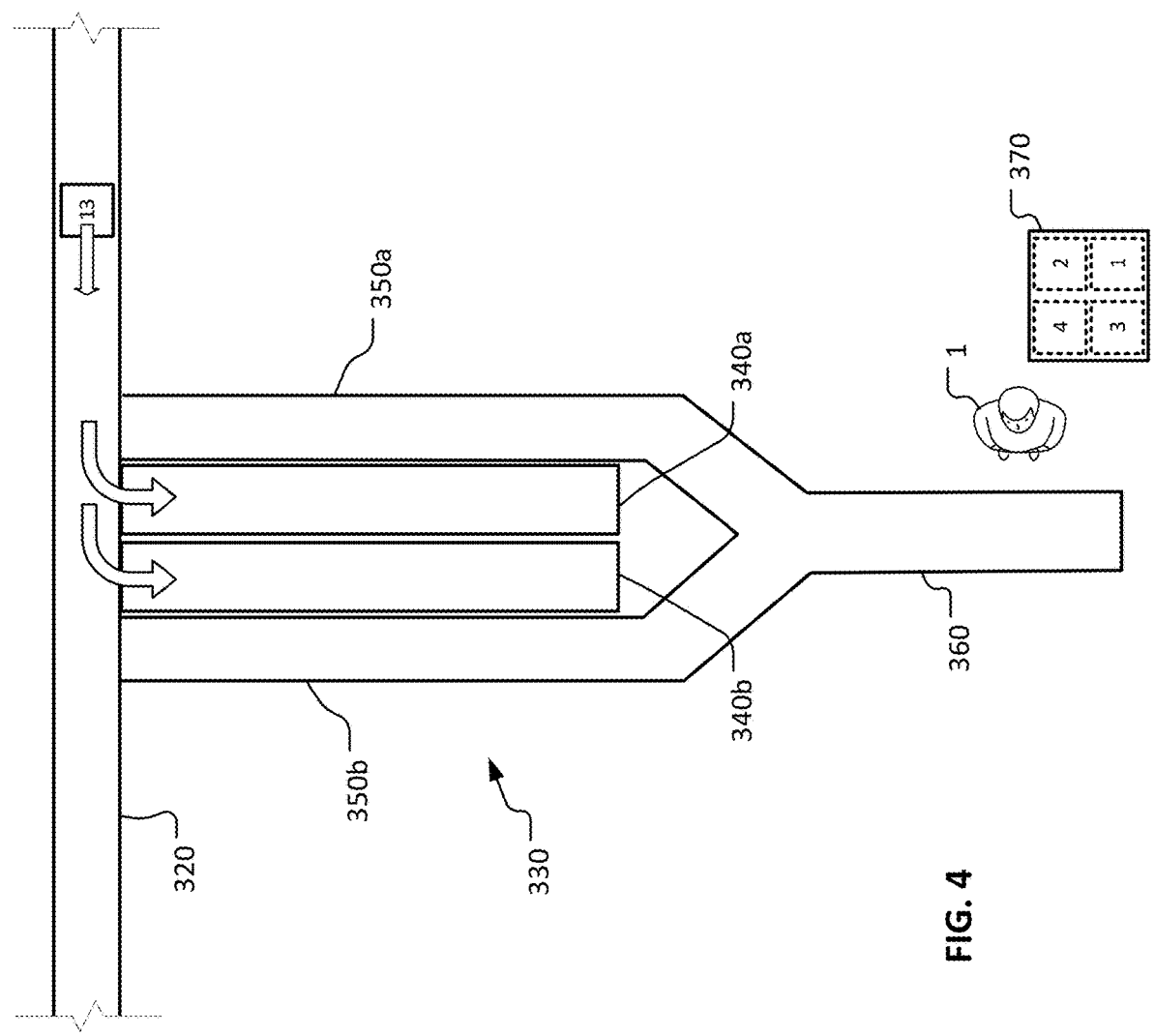
FIG. 4 is a schematic illustration of the warehouse sorting and sequencing system of FIG. 3 depicted at a first point in time in an example operational sequence.

FIG. 4 schematically illustrates a top view (plan view) of a portion of the main conveyor 320 and a single buffering and sequencing system 330 (of which there are multiples in the overall system 300, as shown in FIG. 3). Each of the buffering and sequencing systems 330 of the system 300 can individually function as described hereafter.

The example buffering and sequencing system 330 includes a first buffering conveyor 340a, a second buffering conveyor 340b, a first take-away conveyor 350a, a second take-away conveyor 350b, and a final take-away conveyor 360. The output ends of the first and second take-away conveyors 350a-b connect to the input end of the final take-away conveyor 360.

A warehouse worker 1 (or an automation system such as a robot) is located to transfer items from the final take-away conveyor 360 to a store aisle-ready cart 370. The store aisle-ready cart 370 is configured with particular locations at which specific items are designated to be placed. For example, the store aisle-ready cart 370, as shown, includes locations for items 1-4 (as designated by dashed line boxes 1-4). The store aisle-ready cart 370 can be any type of store-friendly transport vessel.

A primary overall purpose of the buffering and sequencing system 330 is to send items to the worker 1 in a proper sequence for loading the store aisle-ready cart 370 in a pre-established sequence/arrangement. That is, the buffering and sequencing system 330 is configured to receive from the main conveyor 320 items that are designated for a particular truck. The buffering and sequencing system 330 temporarily stores such items until the next item in the proper sequence for loading items into/onto the store aisle-ready cart 370 is available to the buffering and sequencing system 330. Then the items are sent by the buffering and sequencing system 330 to the worker 1 in the proper sequence for loading the store aisle-ready cart 370 in the predetermined desired sequence/arrangement.

The input ends of each of the first and second buffering conveyors 340a-b are connected to the main conveyor 320. The main conveyor 320 is configured so that items can be automatically, selectively transferred from the main conveyor 320 to either of the first and second buffering conveyors 340a-b. For example, the main conveyor 320 is configured with mechanisms to direct and/or push items onto the first and/or second buffering conveyors 340a-b (as indicated by the curved arrows in FIG. 4) using known processes (e.g., pop-up transfer, cross-belt transfer, tilt-tray transfer, shoe-transfer, etc.).

The first and second buffering conveyors 340a-b are configured to temporarily store, or buffer, items (e.g., cartons, containers, packages, boxes, totes, etc.). Additionally, the first and second buffering conveyors 340a-b are configured to automatically, selectively transfer the items onto the first and second take-away conveyors 350a-b. That is, the first and second buffering conveyors 340a-b are configured with mechanisms to direct and/or push items onto the first and second take-away conveyors 350a-b (as indicated by the straight arrows in FIGS. 8-11 and 13) using known processes (e.g., pop-up transfer, cross-belt transfer, tilt-tray transfer, shoe-transfer, etc.). After items have been moved onto the first and second take-away conveyors 350a-b, the items travel to the final take-away conveyor 360 where the worker 1 then transfers the items onto the proper designated positions on/in the store aisle-ready cart 370.

The FIGS. 4-13 are a series of illustrations that depict an example manner in which the buffering and sequencing system 330 is configured and controlled to operate. Other alternatives for the layout of the buffering and sequencing system 330 and of its operation are also envisioned, and without the scope of this disclosure.

In FIG. 4, an item 13 is illustrated as traveling on the main conveyor 320 toward the buffering and sequencing system 330.

Figure 5:
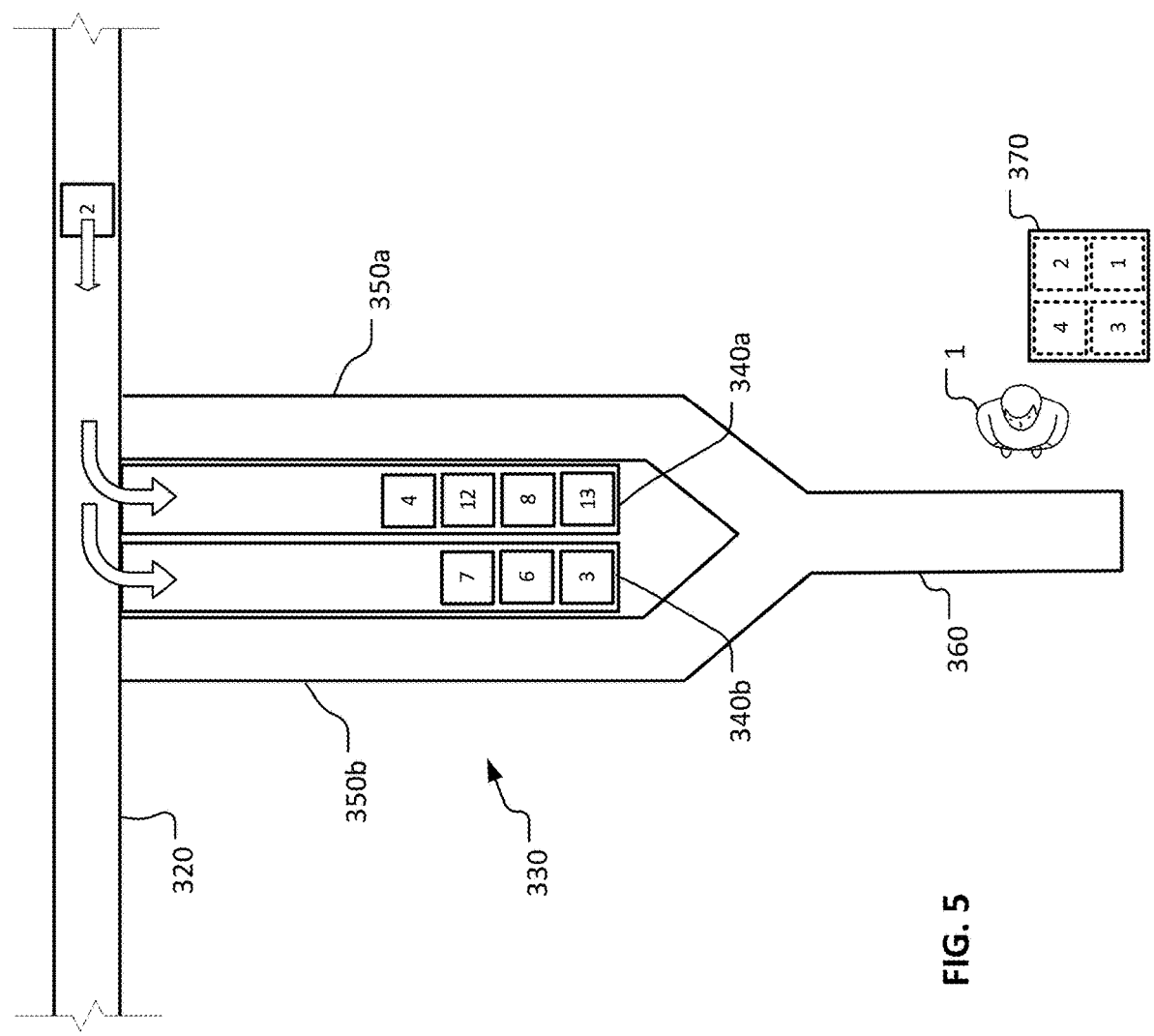
FIG. 5 is a schematic illustration of the warehouse sorting and sequencing system of FIG. 3 depicted at a second point in time in the example operational sequence.

In FIG. 5, item 13 is now shown as residing on the first buffering conveyor 340a. Item 13 was transferred from the main conveyor 320 onto the first buffering conveyor 340a. Items 8, 12, and 4 are also shown as residing on the first buffering conveyor 340a. Additionally, items 3, 6, and 7 are shown as residing on the second buffering conveyor 340b. In other words, items 2-4, 6-8, 10, 12, and 13 are being buffered, or temporarily stored, by the first and second buffering conveyors 340a-b. The items will later be moved from the first and second buffering conveyors 340a-b onto the first and second take-away conveyors 350a-b in the proper sequence for loading the items onto the proper designated positions on/in the store aisle-ready cart 370.

The items 2-4, 6-8, 10, 12, and 13 can be selectively directed to and stored in either the first buffering conveyor 340a or the second buffering conveyor 340b according to various criteria or schemes. An automation control system, fleet management system, the order fulfillment control system 180 (FIG. 1), or any other type of automation controls can run an algorithm and automatically control the system 300 in accordance with the following example criteria or schemes, or equivalents thereof. For example, in some embodiments items are directed from the main conveyor 320 to either the first buffering conveyor 340a or the second buffering conveyor 340b on the basis of equal utilization of the first buffering conveyor 340a and the second buffering conveyor 340b. That is, items are directed to whichever one of first buffering conveyor 340a or the second buffering conveyor 340b is storing the fewest items (or, said another way, has the most available capacity to store additional items). In some embodiments, items are directed from the main conveyor 320 to either the first buffering conveyor 340a or the second buffering conveyor 340b on the basis of fully utilizing one of either the first buffering conveyor 340a or the second buffering conveyor 340b before directing items to the other of the first buffering conveyor 340a or the second buffering conveyor 340b. In some embodiments, items are directed from the main conveyor 320 to either the first buffering conveyor 340a or the second buffering conveyor 340b on the basis of first utilizing one of the first buffering conveyor 340a or the second buffering conveyor 340b up to a threshold level (e.g., 30%, 40%, 50%, 60%, 70%, etc.) before directing items to the other of the first buffering conveyor 340a or the second buffering conveyor 340b. It should be understood that many different criteria or schemes are envisioned for determining and controlling to which of the first buffering conveyor 340a or the second buffering conveyor 340b items are selectively directed to from the main conveyor 320.

In FIG. 5, no items have been as of yet transferred to the store aisle-ready cart 370 because item 1 (the first item that is to be transferred to the store aisle-ready cart 370) has not yet arrived at the buffering and sequencing system 330.

Figure 6:
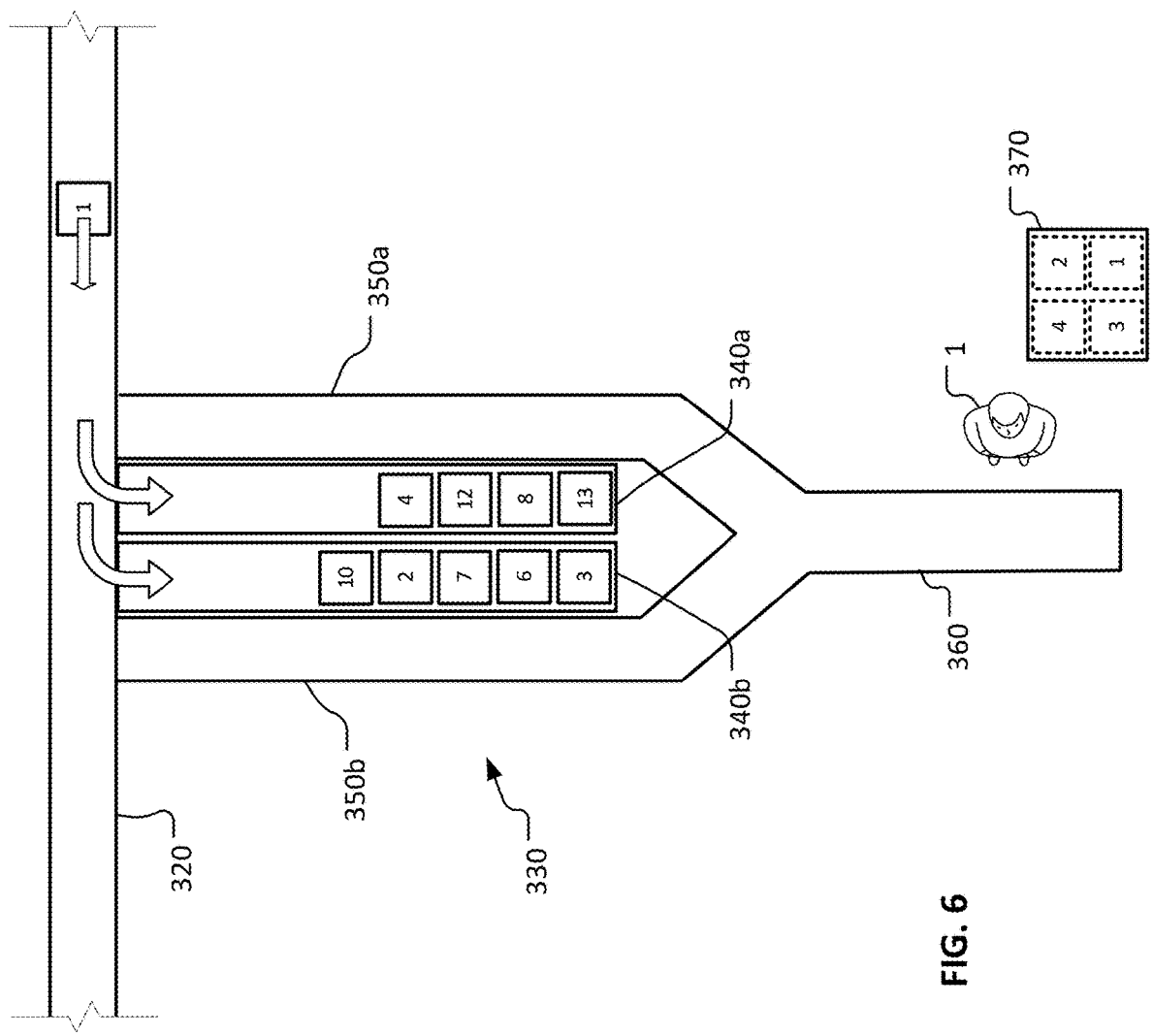
FIG. 6 is a schematic illustration of the warehouse sorting and sequencing system of FIG. 3 depicted at a third point in time in the example operational sequence.

In FIG. 6, item 1 is illustrated as traveling on the main conveyor 320 toward the buffering and sequencing system 330. Meanwhile, multiple other items are being temporarily stored by the first and second buffering conveyors 340a-b.

Figure 7:
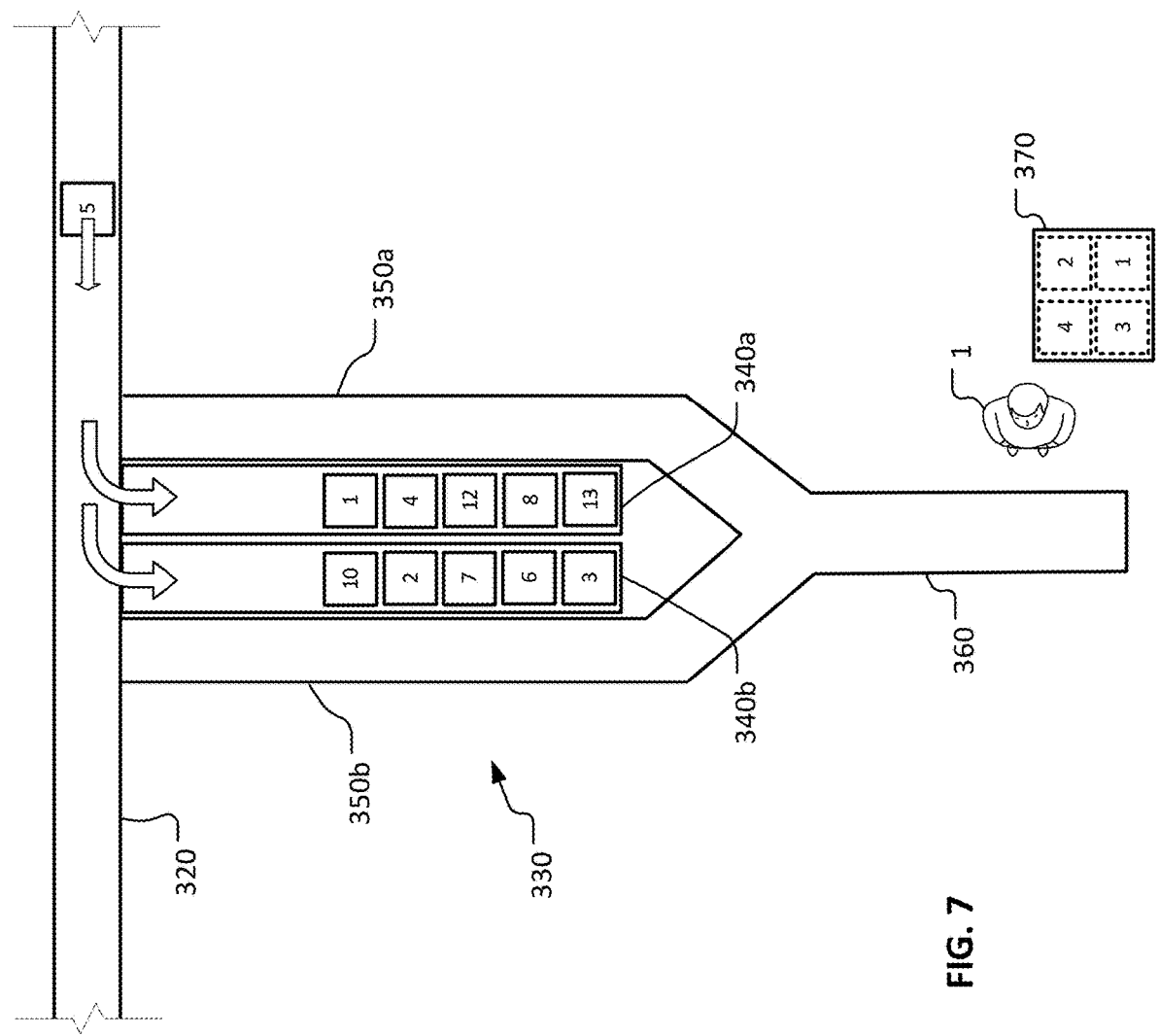
FIG. 7 is a schematic illustration of the warehouse sorting and sequencing system of FIG. 3 depicted at a fourth point in time in the example operational sequence.

In FIG. 7, now item 1 is illustrated as residing on the first buffering conveyor 340a of the buffering and sequencing system 330. The multiple other items are still also being temporarily stored by the first and second buffering conveyors 340a-b.

Figure 8:
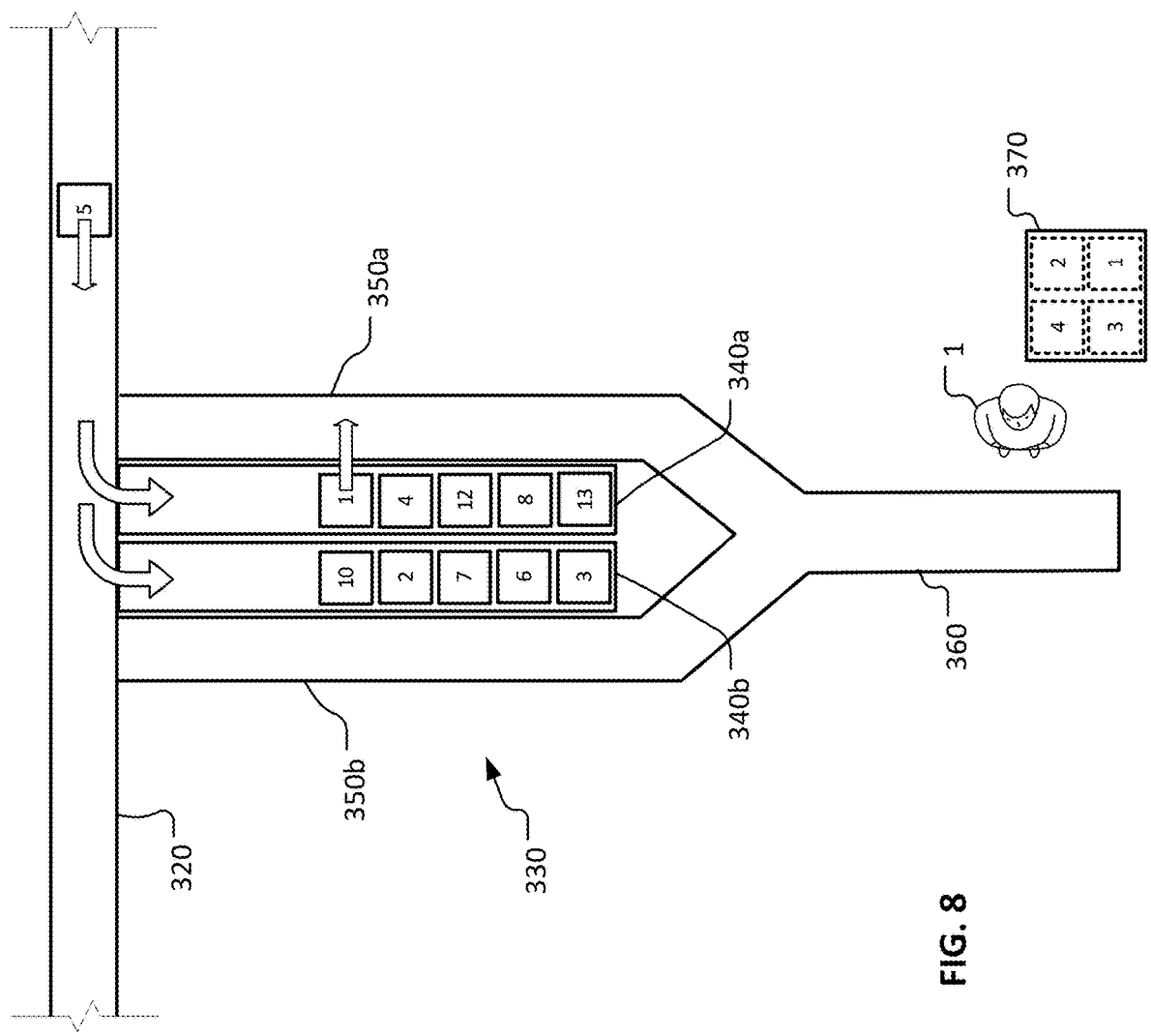
FIG. 8 is a schematic illustration of the warehouse sorting and sequencing system of FIG. 3 depicted at a fifth point in time in the example operational sequence.

In FIG. 8, as depicted by the arrow, item 1 is now going to be transferred from the first buffering conveyor 340a to the first take-away conveyor 350a.

Figure 9:
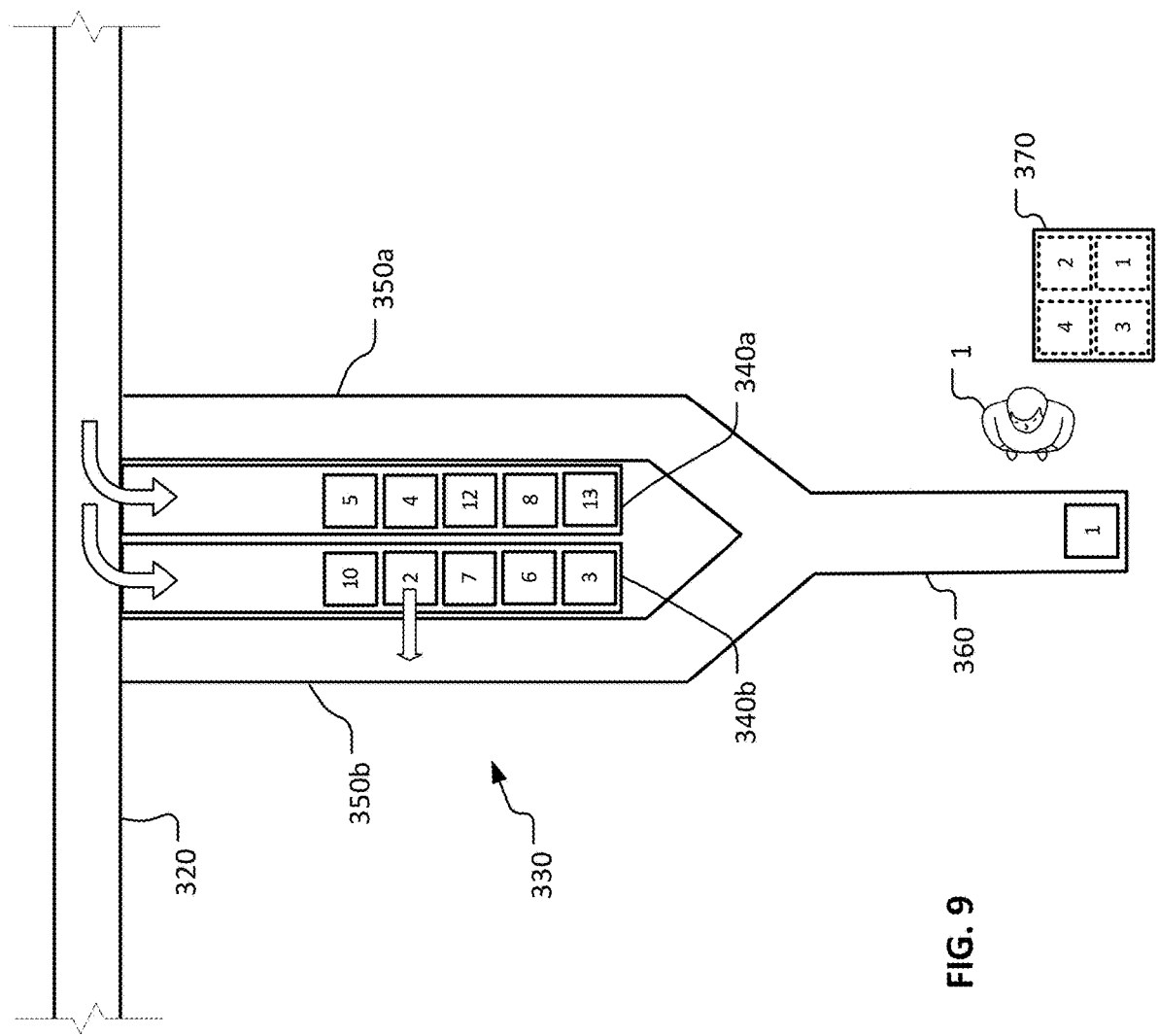
FIG. 9 is a schematic illustration of the warehouse sorting and sequencing system of FIG. 3 depicted at a sixth point in time in the example operational sequence.

In FIG. 9, item 1 is now positioned on the final take-away conveyor 360 where the worker 1 can access it to move it onto the store aisle-ready cart 370 (into position 1 on the store aisle-ready cart 370). In addition, as depicted by the arrow, item 2 is next going to be transferred from the second buffering conveyor 340b to the second take-away conveyor 350b.

Figure 10:
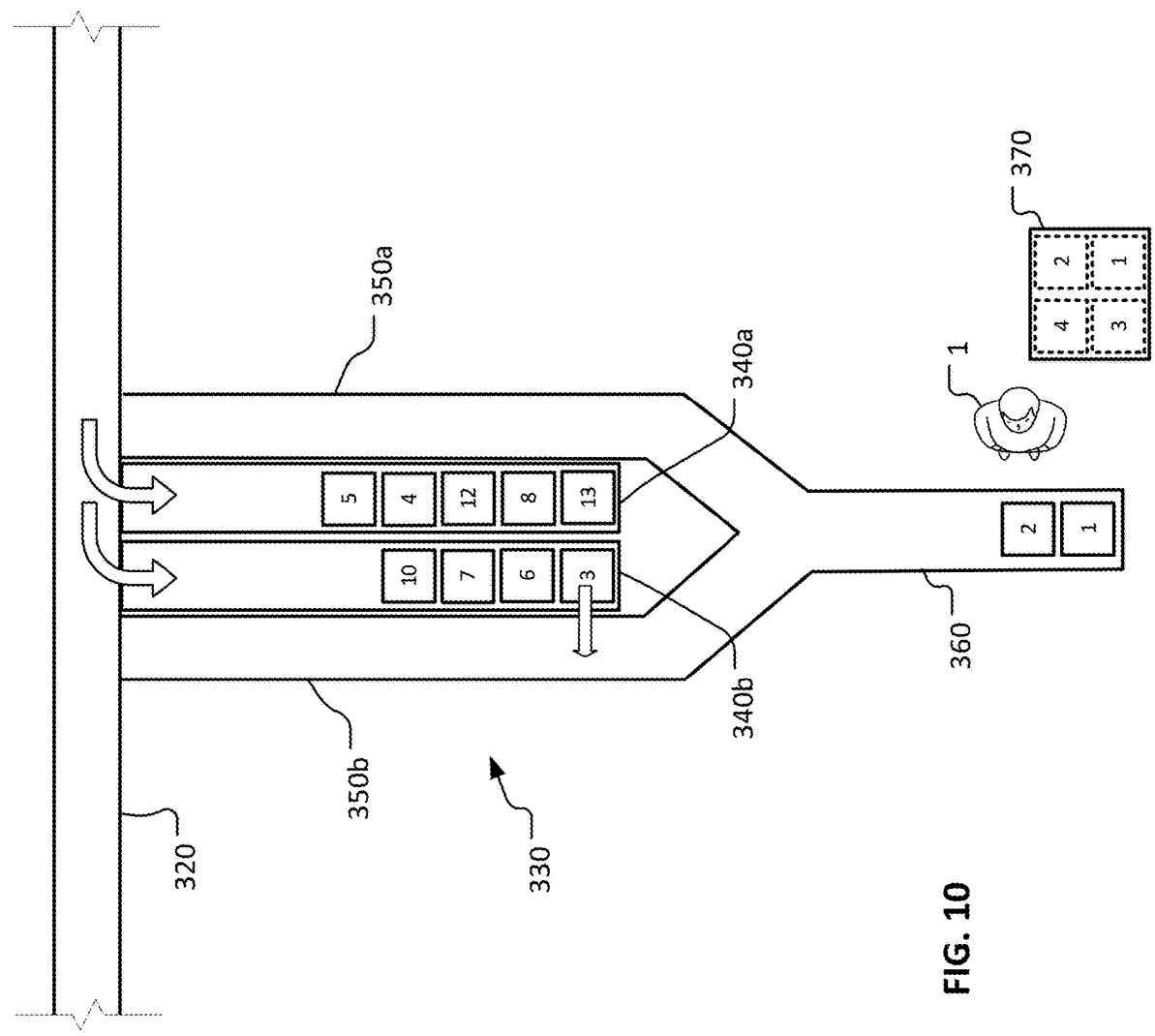
FIG. 10 is a schematic illustration of the warehouse sorting and sequencing system of FIG. 3 depicted at a seventh point in time in the example operational sequence.

In FIG. 10, item 2 is now positioned on the final take-away conveyor 360 where the worker 1 can access it to move it onto the store aisle-ready cart 370 (into position 2 on the store aisle-ready cart 370). In addition, as depicted by the arrow, item 3 is next going to be transferred from the second buffering conveyor 340*b* to the second take-away conveyor 350*b*.

Figure 11:
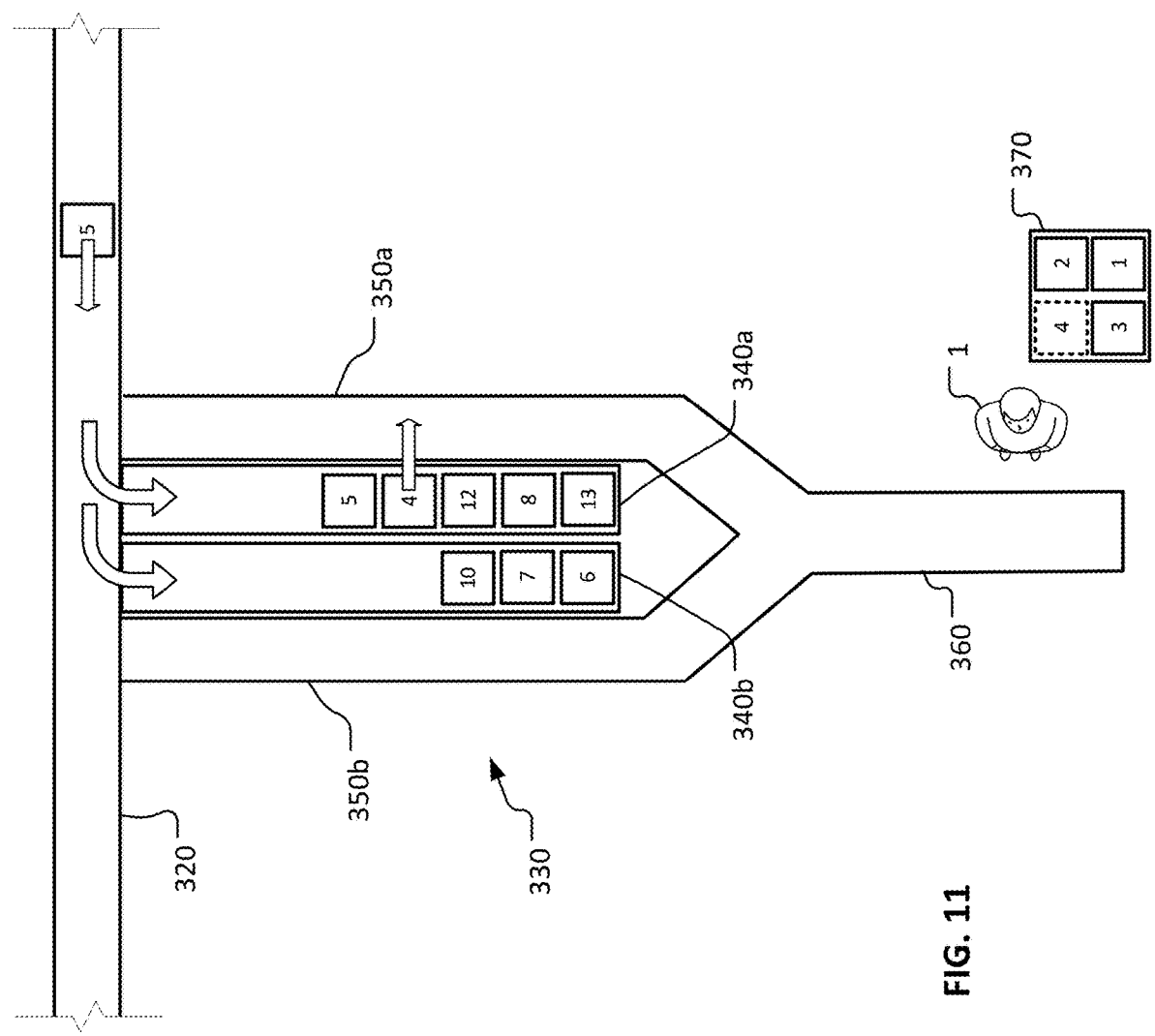
FIG. 11 is a schematic illustration of the warehouse sorting and sequencing system of FIG. 3 depicted at an eighth point in time in the example operational sequence.

In FIG. 11, the worker 1 has now transferred items 1, 2, and 3 to the store aisle-ready cart 370 (in positions 1, 2, and 3 of the store aisle-ready cart 370, respectively). In addition, as depicted by the arrows, item 4 is next going to be transferred from the first buffering conveyor 340*a* to the first take-away conveyor 350*a* and item 5 is traveling on the main conveyor 320 toward the buffering and sequencing system 330.

Figure 12:
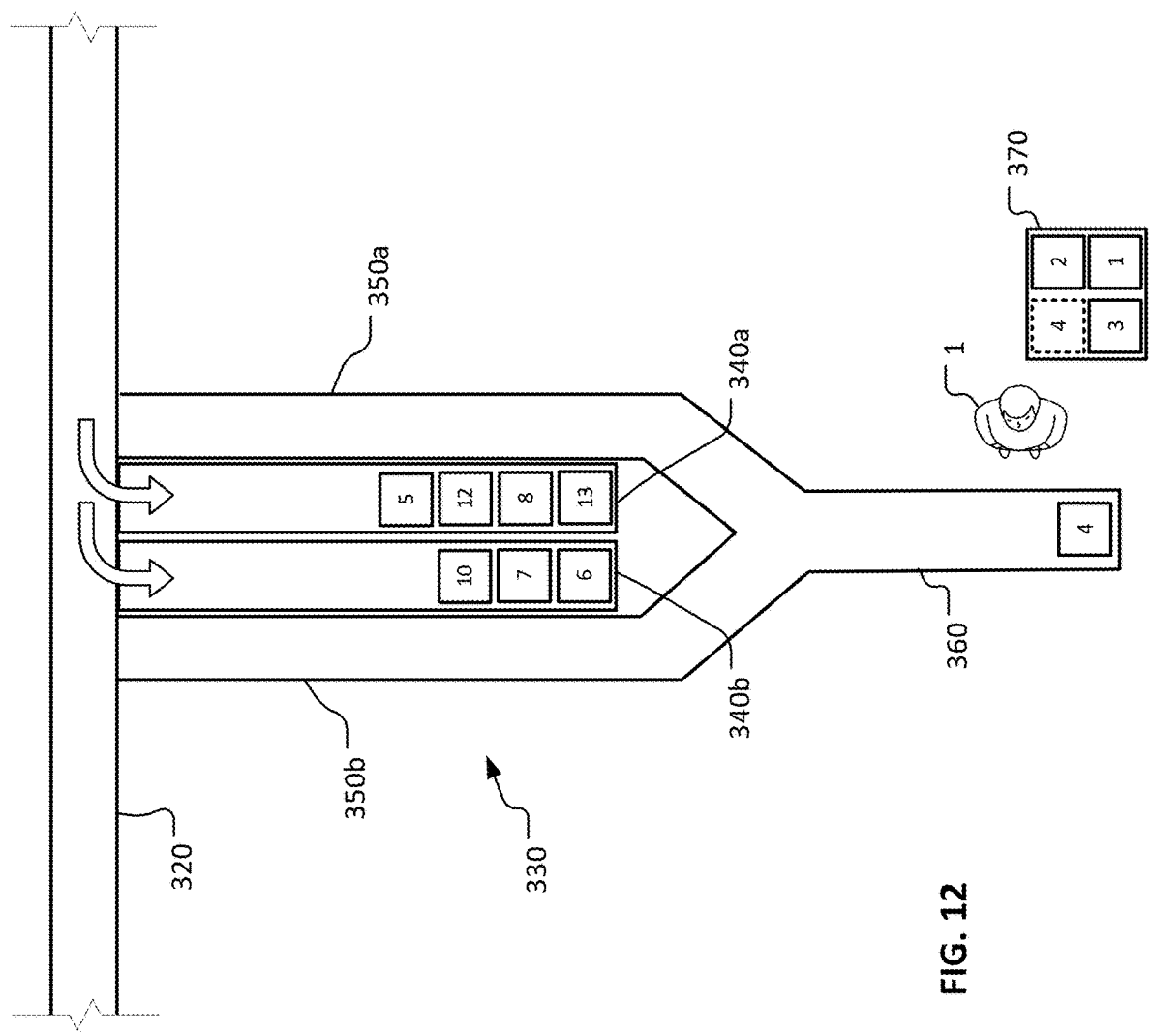
FIG. 12 is a schematic illustration of the warehouse sorting and sequencing system of FIG. 3 depicted at a ninth point in time in the example operational sequence.

In FIG. 12, item 4 is now positioned on the final take-away conveyor 360 where the worker 1 can access it to move it onto the store aisle-ready cart 370 (into position 4 on the store aisle-ready cart 370). In addition, as depicted by the arrow, item 2 is next going to be transferred from the second buffering conveyor 340*b* to the second take-away conveyor 350*b*.

Figure 13:
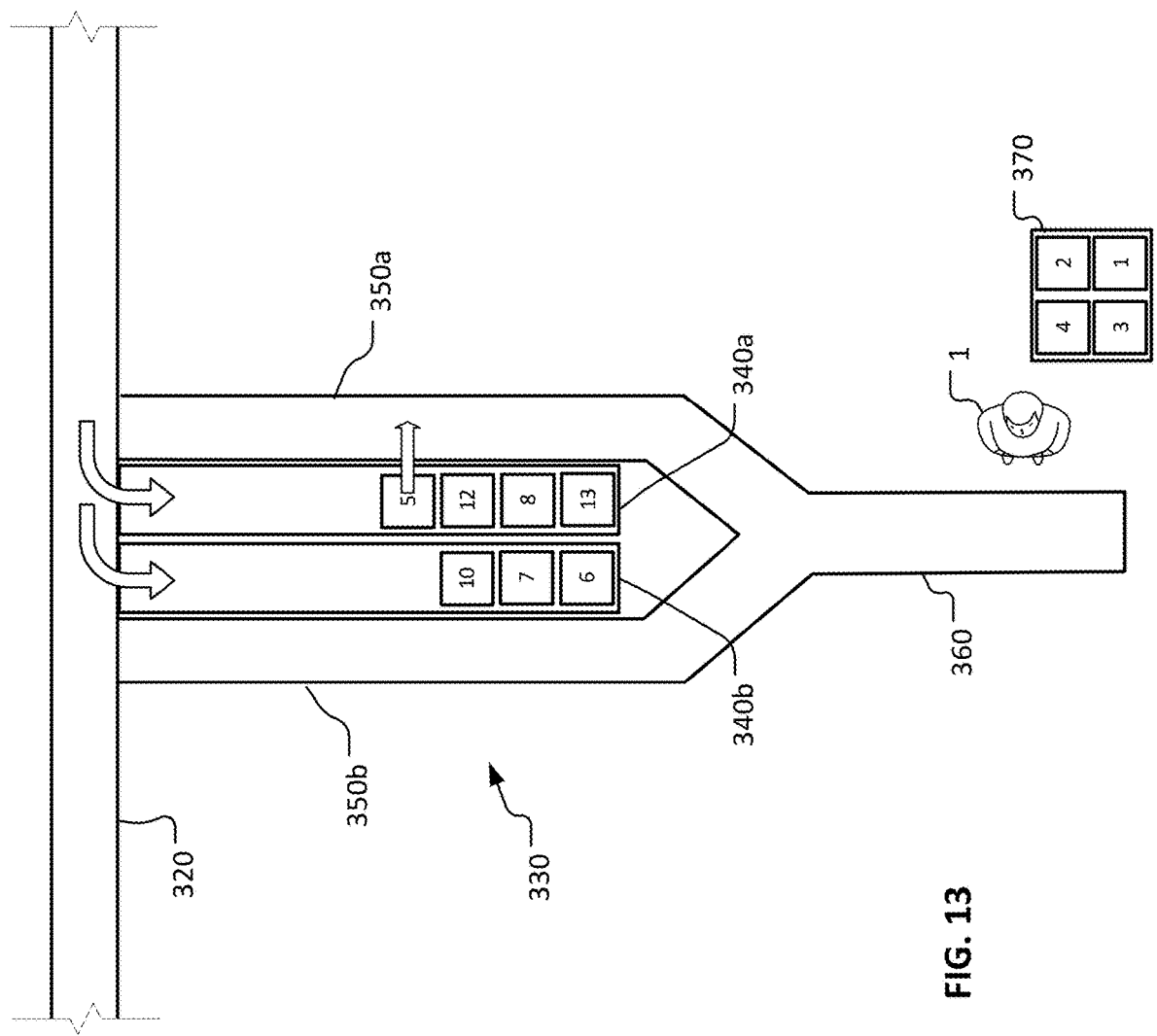
FIG. 13 is a schematic illustration of the warehouse sorting and sequencing system of FIG. 3 depicted at a tenth point in time in the example operational sequence.

In FIG. 13, the worker 1 has now transferred item 4 to the store aisle-ready cart 370 (in position 4 of the store aisle-ready cart 370). In addition, as depicted by the arrow, item 5 is next going to be transferred from the first buffering conveyor 340*a* to the first take-away conveyor 350*a*.

In the example manner described above in reference to the sequential FIGS. 4-13, the system 300, which includes the buffering and sequencing system 330, functions to sort and sequence items into a desired order of individual items. In the example provided, the desired order of items corresponds to the sequence in which the store aisle-ready cart 370 needs to be populated (which in turn corresponds to the sequence of items that makes for efficient replenishment of store aisles).

Other variations of the buffering and sequencing system 330 are also envisioned. For example, while the configuration of the first and second take-away conveyors 350*a-b* and the final take-away conveyor 360 is depicted as a Y-shape or wishbone shape, in some embodiments the final take-away conveyor 360 is eliminated and the first and second take-away conveyors 350*a-b* individually extend all the way to where the worker 1 is stationed.

In some embodiments, a return conveyor is also included by which items from the buffering and sequencing system 330 can be conveyed back onto the main conveyor 320. The transfer of the item(s) to be returned from the buffering and sequencing system 330 to the return conveyor can be automated or manual.

While the buffering and sequencing system 330 is depicted as having two buffering conveyors (i.e., the first and second buffering conveyors 340*a-b*), in some embodiments, a single buffering conveyor that branches off the main conveyor 320 is used. When such a single buffering conveyor is used, one or two take-away conveyors can be used with the single buffering conveyor.

While the buffering and sequencing system 330 is depicted as having a single store aisle-ready cart 370 vessel that is being loaded with items, in some embodiments the buffering and sequencing system 330 can include two or more vessels (such as, but not limited to, store aisle-ready carts) that are being loaded.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a sub combination.

Particular embodiments of the subject matter have been described. Other embodiments are within the scope of the following claims. For example, the actions recited in the claims can be performed in a different order and still achieve desirable results. While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A system for sequencing items of a shipment into a store aisle-ready arrangement, the system comprising:
   a main conveyor configured to transport the items;
   a buffering conveyor branching off of the main conveyor and configured to receive the items from the main conveyor, the buffering conveyor configured to temporarily store the items;
   a take-away conveyor extending adjacently along a side of and parallel to the buffering conveyor and configured to receive the items from the buffering conveyor; and
   a control system configured to:
      control the main conveyor to cause the items to individually transfer from the main conveyor to the buffering conveyor;
      determine whether each item of the items transferred to the buffering conveyor is a next item to be transferred to a store-friendly transport vessel; and
      control the buffering conveyor to cause an item of the items to transfer from any location of multiple locations along the buffering conveyor to the take-away conveyor in response to determining that the item is the next item to be transferred to the store-friendly transport vessel.

2. The system of claim 1, wherein the buffering conveyor is a first buffering conveyor and the take-away conveyor is a first take-away conveyor, and wherein the system further comprises a second buffering conveyor and a second take-away conveyor.

3. The system of claim 2, wherein the control system is configured to control the main conveyor to individually transfer the items to either the first buffering conveyor or the second buffering conveyor using criteria.

4. The system of claim 3, wherein the criteria comprises obtaining equal utilization of the first and second buffering conveyors.

5. The system of claim 2, wherein output ends of the first and second take-away conveyors are each connected to a final take-away conveyor.

6. The system of claim 5, wherein the first and second take-away conveyors and the final take-away conveyor are arranged in a Y-shape.

7. The system of claim 6, with the first and second buffering conveyors are located between the first and second take-away conveyors.

8. An automated method for sequencing items of a shipment into a store aisle-ready arrangement, the method comprising:
   controlling a main conveyor to cause the items to individually transfer from the main conveyor to a buffering conveyor that is a branch of the main conveyor;
   determining whether each item of the items transferred to the buffering conveyor is a next item to be transferred to a store-friendly transport vessel; and
   controlling the buffering conveyor to cause an item of the items to transfer from any location of multiple locations along the buffering conveyor to a take-away conveyor extending adjacently along a side of and parallel to the buffering conveyor in response to determining that the item is the next item to be transferred to the store-friendly transport vessel.

9. The method of claim 8, wherein each of the items transferred to the buffering conveyor remain on the buffering conveyor until it is the next item to be transferred to the store-friendly transport vessel.

10. The method of claim 8, wherein the buffering conveyor is a first buffering conveyor, and wherein the method further comprises controlling the main conveyor to cause the items to individually transfer from the main conveyor to either the first buffering conveyor or a second buffering conveyor that is also a branch of the main conveyor.

11. The method of claim 10, wherein the main conveyor is controlled to individually transfer the items to either the first buffering conveyor or the second buffering conveyor using criteria.

12. The method of claim 11, wherein the criteria comprises obtaining equal utilization of the first and second buffering conveyors.

13. The method of claim 11, wherein the criteria comprises fully utilizing the first buffering conveyor before utilizing the second buffering conveyor.

14. The method of claim 11, wherein the criteria comprises utilizing the first buffering conveyor to a threshold percentage before utilizing the second buffering conveyor.

15. A warehouse system for sorting and sequencing items, the system comprising:
   a main conveyor configured to transport the items;
   a first buffering and sequencing system comprising:
      a first buffering conveyor branching off of the main conveyor and configured to receive the items from the main conveyor, the first buffering conveyor configured to temporarily store the items; and
      a first take-away conveyor extending adjacently along a first side of and parallel to the first buffering conveyor and configured to receive the items from the first buffering conveyor; and
   a second buffering and sequencing system comprising:
      a second buffering conveyor branching off of the main conveyor and having a first side extending adjacently along a second side of and parallel to the first buffering conveyor, the second buffering conveyor configured to receive the items from the main conveyor, the second buffering conveyor configured to temporarily store the items; and
      a second take-away conveyor extending adjacently along a second side of and parallel to the second buffering conveyor and configured to receive the items from the second buffering conveyor.

16. The system of claim 15, further comprising a control system configured to control the main conveyor to cause: (i) a first group of the items to individually transfer from the main conveyor to the first buffering conveyor and (ii) a second group of the items to individually transfer from the main conveyor to the second buffering conveyor.

17. The system of claim 16, wherein the first group of the items are designated for a first shipment and the second group of items are designated for a second shipment that differs from the first shipment.

18. The system of claim 16, wherein the control system is configured to:
   determine whether each item of the first group of items transferred to the first buffering conveyor is a next item to be transferred to a first store-friendly transport vessel; and
   control the first buffering conveyor to cause an item of the first group of items to transfer from the first buffering conveyor to the first take-away conveyor in response to determining that the item is the next item to be transferred to the first store-friendly transport vessel.

19. The system of claim 18, wherein the control system is configured to:
   determine whether each item of the second group of items transferred to the second buffering conveyor is a next item to be transferred to a second store-friendly transport vessel; and
   control the second buffering conveyor to cause an item of the second group of items to transfer from the second buffering conveyor to the second take-away conveyor in response to determining that the item is the next item to be transferred to the second store-friendly transport vessel.

20. The system of claim 15, further comprising a third buffering and sequencing system comprising:
   a third buffering conveyor branching off of the main conveyor and configured to receive the items from the main conveyor, the third buffering conveyor configured to temporarily store the items; and
   a third take-away conveyor adjacent to the buffering conveyor and configured to receive the items from the third buffering conveyor.

* * * * *